July 25, 1939.   LE ROY J. KNETTLE   2,166,957
BOLT RETHREADER
Filed Oct. 3, 1938
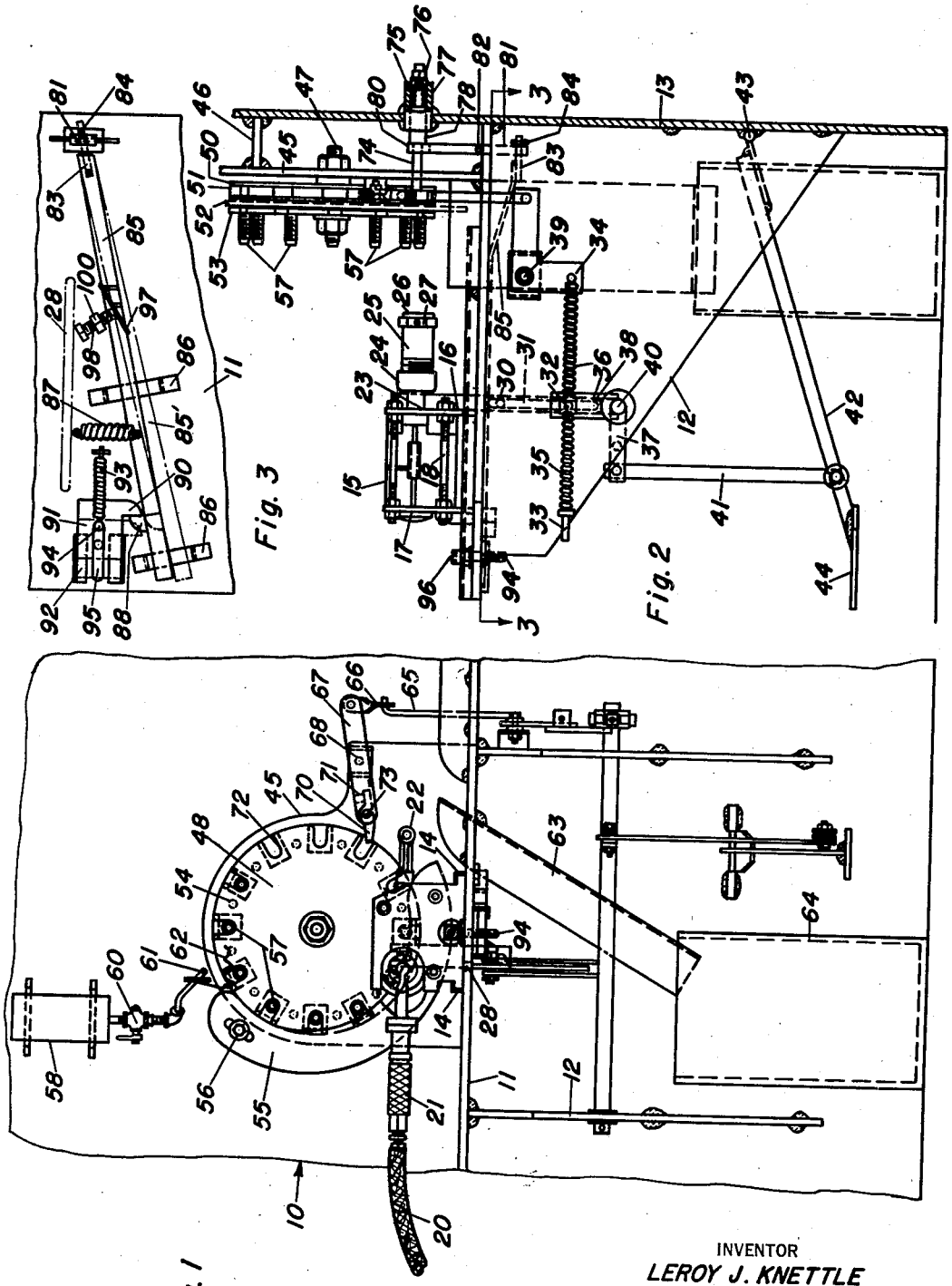
INVENTOR
LEROY J. KNETTLE
BY
*Ransom K. Davis*
ATTORNEY

UNITED STATES PATENT OFFICE 2,166,957

BOLT RETHREADER

Le Roy J. Knettle, Gloucester, N. J.

Application October 3, 1938, Serial No. 232,935

4 Claims. (Cl. 10—105)

(Granted under the act of March 3, 1883, as amended April 30, 1928; 370 O. G. 757)

This invention relates to a device for rethreading used bolts and has for an object to provide a machine which may be used in a quick and easy manner for rethreading used bolts.

A further object of this invention is to provide a bolt rethreading machine which is operable so that it may be set up at a position convenient to the work being performed.

A further object of this invention is to provide a bolt rethreading machine having a rotatable disc into which the bolts may be fed into proper position for rethreading and then discharging the rethreaded bolts into a suitable placed receptacle.

A further object of this invention is to provide a bolt rethreading machine of an operable nature wherein the operating machine included thereon may be pneumatically operated, thereby permitting the use of the machine at any place where a source of pneumatic power may be available.

With the foregoing and other objects in view, the invention consists in the construction, combination and arrangement of parts hereinafter described and illustrated in the drawing, in which:

Fig. 1 is a front elevational view of the rethreading machine.

Fig. 2 is a side view of Fig. 1; and,

Fig. 3 is a fragmentary view on line 3—3 of Fig. 2.

There is shown at 10 the rethreading machine of this invention including a table top 11 supported on table support brackets 12. The brackets 12 extend forwardly from a rear wall or bracket 13 suitably supported in any convenient manner. A pair of tracks 14 are provided on which may be reciprocated the threading machine carriage 15 supported between a front plate 16 and a rear plate 17 held together by long bolts 18. The machine within the carriage 15 is pneumatically operated, being connected to a source of pneumatic power by the pipe 20 passing through a hollow handle 21. Another handle 22 on the opposite side thereof facilitates the operation of the machine. Inserted in the machine is a shank 23 to which is secured a pipe cap 24 carrying pipe socket 25 within the end of which is located a bolt die 26, the bolt die 26 being removably held in position in a suitable manner within the socket by band 27 so that bolt dies of different threads may be substituted according to the size of bolt that is to be rethreaded.

Extending downwardly through a slot 28 in the table surface is the shaft trip lever 30 provided with a slot 31 through which extends a pin 32 for transversely moving the link 33 connected at one end to a bell crank 34 and operating against the springs 35 and 36 tending to restore it to the position shown in Fig. 2.

As will be apparent, withdrawing the machine carriage 15 over the tracks 14 toward the edge of the table will cause the bell crank 34 to move about its pivot 39 in a clockwise direction. This action may be supplemented by means of the bell crank lever 37 provided with a slot 38 cooperating with pin 32 and adapted to rotate about its pivot 40 in a counter-clockwise direction when drawn by the link 41 attached to the foot treadle lever 42 pivoted as at 43. Placing the foot on the treadle 44 and pressing downwardly facilitates withdrawal of machine carriage 15 toward the end of the table.

A front bracket 45 supported on the table 11 and braced by an arm 46 from the rear bracket 13 is provided with a center bolt 47 on which is pivoted the bolt disc 48. This bolt disc 48 includes a backing plate 50 adjacent to which is a bolt disc head 51 next to which is a bolt disc locking plate 52 and in the front is a bolt disc support plate 53. The disc 48 is held assembled by a plurality of tap bolts 54.

When different sized bolts and bolt heads are to be worked on, the head plate and locking plate may be changed for other plates having appropriate sized slots in the edges thereof so as to receive and support the bolts. The guard 55 adjustably held in position by the bolt 56 holds the bolts 57 in position in the slots after they are placed therein at the top of the disc until they have come around the bottom in front of the bolt die 26 carried by the machine carriage 15.

An oil reservoir 58 with a control valve 60 has a discharge pipe 61 from which depends a piece of chamois 62 for lubricating the bolts 57 and facilitating their rethreading by the bolt die 26. After the bolts 57 have been rethreaded they pass successively beyond the lower edge of the guard 55 and drop into a chute 63 leading through the table 11 into a suitably placed receptacle 64.

At the end of each rethreading operation the machine carriage 15 is withdrawn toward the edge of the table, causing bell crank 34 to rotate in a clockwise direction. This bell crank 34 has a connecting rod 65 connected by a link 66 to one end of a lever 67 pivoted at 68 to the bracket 45. The other end of the lever 67 is provided with a pawl finger 70 yieldably held in position by a tension spring 71. As the bell crank lever 34 rotates in a clockwise direction the pawl finger 70 moves upwardly into the nearest slot 72 of the disc 48 and rotates the disc 48 a distance equal to the distance between the bolt slots 72. When the bell crank 34 returns in a counter-clockwise direction to its normal position the finger 70 pivots as at 73 against the tension spring, allowing the lever 67 to likewise be returned to its normal position.

To insure that the disc 48 will be in proper position holding the lowermost bolt 57 exactly centered with the path of the bolt die 26 on machine carriage 15, a locking plunger 74 is yieldably held in suitably positioned recesses in the back of disc 48 by means of a spring 75 operating against a plug 76 in a cylinder 77. The locking plunger 74 carries a sleeve 78 against which the bifurcated end 80 of a trip bar 81 may press. The trip bar 81 is pivoted as at 82 whereby forward motion of the lower end of the trip bar 81 will cause retraction of the locking pin 74 from the locking apertures in the disc 48 allowing the locking plunger to be withdrawn in order to rotate the disc 48.

An arm 83 extends through the lower end of trip bar 81 and is pinned thereto as at 84 whereby forward motion of the arm 83 toward the front edge of the table pivots the trip bar 81 to withdraw the locking plunger 74 from engagement with the disc 48. The arm 83 is secured to the rear end of a release cam bar 85 held on the bottom of the table 11 by supporting brackets 86. A tension spring 87 tends to hold release cam bar in the normal full line position shown in Fig. 3. The release cam bar 85 carries a release cam block 88 shaped as shown and adapted to contact with a main cam block 90 carried by a main cam 91 slidable on brackets 92 against a spring 93. A trip bracket 94 secured to the main cam 91 extends through a slot 95 in the table 11 and is provided with a bracket head 96 in the path of the machine carriage plate 17. The release cam bar 85 also carries an angular adjusting arm 97 which contacts with an adjusting bolt 98 threaded through a nut 100 secured to the bottom of the table 11. Retraction of the machine carriage 15 away from the disc 48 toward the end of the table 11 forces the plate 17 to contact the bracket head 96 and pull the main cam 91 in the same direction, the main cam block 90 similarly pulling on the release cam block 88, thus pulling the release cam bar 85 to withdraw the locking plunger 74 from the disc 48.

The adjusting arm 97 against the end of bolt 98 causes the release cam bar 85 to simultaneously move transversely to the dot dash line position 85', allowing release cam block 88 to disengage from the main cam block 90, the spring 87 immediately restoring the release cam bar 85 to normal position, thus allowing spring 75 to press the locking plunger 74 into the appropriate locking aperture.

In operation, the operator feeds bolts 57 into the slots 72 at the top of the disc 48 one by one. With the plunger 74 holding the disc 48 against rotation the machine carriage 15 is moved forwardly in its tracks 14, the power being turned on by suitable manipulation of the handle 21 on the power conduit 20 and the carriage moved forwardly causing the bolt die 26 to engage the lowermost bolt 57 and appropriately thread it. The handle 21 is then manipulated to reverse the rotation of the die 26, allowing it to disengage from the bolt 57 and the carriage is withdrawn toward the end of the table 11 on tracks 14.

Simultaneously, the treadle 44 is depressed to assist in this withdrawing action. As the carriage is withdrawn the link 33 is pulled by the trip lever 30 to rotate the crank 34 in clockwise direction, causing lever 67 to pivot and bring pawl finger 70 into the appropriate slot 72. Simultaneously, the machine carriage plate 17 contacting with the bracket head 96 moves the main cam 91 and the cam block 90 against the release cam block 88 to pull the release cam 85 and trip bar 81 to withdraw the locking plunger 74 from contact in the appropriate aperture in disc 48, releasing the disc 48 from locking engagement therewith just as pawl finger 70 contacts the side of slot 72 to rotate the disc 48.

Slight further movement of the machine carriage along the table 11 releases the cam blocks 90 and 88 from interengagement and the release cam bar 85 is restored to normal position, allowing the spring 75 to force the plunger 74 into the next appropriate locking aperture in disc 48 as the lever 67 completes its pivoting movement.

Machine carriage 15 is then ready to be pressed forwardly and thread the next successive bolt 57 now held in appropriate position by the disc 48 being held locked by the locking plunger 74. The curved shapes of the backs of the cam blocks 88 and 90 permit the main cam block 90 to be drawn past the release cam block 88 by the tension spring 93, release cam spring 87 yielding slightly to permit this movement and to then restore the release cam 85 to the normal position with the cam blocks 88 and 90 in interengagement, as shown in full lines in Fig. 3, ready for the next operation. The same operation is repeated with each bolt as it is rethreaded and then discharged through the chute 63 to receptacle 64.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. A bolt rethreading device comprising a rotatable bolt-holding disc, means for locking said disc against rotation, a bolt-threading die adapted to engage a bolt held in said bolt-holding disc, means supporting said bolt-threading die for reciprocation to bolt-threading and bolt-disengaging position, means operable by the reciprocation of said threading die for unlocking the disc and rotating the disc while the threading die is disengaged from the bolt to be threaded, said locking means comprising a spring-pressed plunger and a series of suitably spaced apertures in said disc into any one of which said plunger may selectively penetrate to lock said disc, said unlocking means including a pivoted lever, one end of which is connected to said locking plunger, a release cam bar connected to the other end of said pivoted lever, a main cam bar adapted to engage said release cam bar, and means connected to said main cam bar extending into the path of said reciprocating threading die to operate said cam bar as said rethreading die is reciprocated away from said disc.

2. A bolt rethreading machine comprising a rotatable bolt-holding disc, means for locking said disc against rotation, a bolt-threading die adapted to engage a bolt held in said bolt-holding disc, means supporting said bolt-threading die for reciprocation to bolt-threading and bolt-disengaging position, means operable by the reciprocation of said threading die for unlocking the disc and rotating the disc while the threading die is disengaged from the bolt to be threaded, said locking means comprising a spring-pressed plunger and a series of suitably spaced apertures in said disc into any one of which said plunger may selectively penetrate to lock said disc, said unlocking means including a pivoted lever, one end of which is connected to said locking plunger, a release cam bar connected to the other end of said pivoted lever, a main cam bar adapted to engage said release cam bar, means connected to said main cam bar extending into the path of said reciprocating rethreading die to operate said cam bars as said rethreading die is reciprocated away from said disc, said disc rotating means including a pivoted lever, a pawl at one end of said lever to engage said disc to rotate the same, a link at the other end of said lever, and means connecting said link to said die to operate said link and pivot said lever as said die is reciprocated.

3. A bolt rethreading machine comprising a rotatable bolt-holding disc, means for locking said disc against rotation, a bolt-threading die adapted to engage a bolt held in said bolt-holding disc, means supporting said bolt-threading die for reciprocation to bolt-threading and bolt-disengaging position, means operable by the reciprocation of said threading die for unlocking the disc and rotating the disc while the threading die is disengaged from the bolt to be threaded, said disc rotating means including a pivoted lever, a pawl at one end of said lever to engage said disc to rotate the same, a link at the other end of said lever, means connecting said link to said die to operate said link and pivot said lever as said die is reciprocated, said last mentioned means comprising a bell crank to which said link is connected, a shaft connected to said bell crank, a trip bar connected to said die, and a pin and slot connection between said trip bar and said shaft.

4. A bolt rethreading machine comprising a rotatable bolt-holding disc, means for locking said disc against rotation, a bolt-threading die adapted to engage a bolt held in said bolt-holding disc, means supporting said bolt-threading die for reciprocation to bolt-threading and bolt-disengaging position, means operable by the reciprocation of said threading die for unlocking the disc and rotating the disc while the threading die is disengaged from the bolt to be threaded, said disc rotating means including a pivoted lever, a pawl at one end of said lever to engage said disc to rotate the same, a link at the other end of said lever, means connecting said link to said die to operate said link and rotate said lever as said die is reciprocated, said last mentioned means comprising a bell crank to which said link is connected, a shaft connected to said bell crank, a trip bar connected to said die, a pin and slot connection between said trip bar and said shaft, a second bell crank, a pin and slot connection between said second bell crank and said trip bar, and a foot treadle connected to said second bell crank to assist in operating said shaft.

LE ROY J. KNETTLE.